United States Patent
Kim (10) Patent No.: US 10,099,685 B2
(45) Date of Patent: Oct. 16, 2018

(54) HYBRID ELECTRIC VEHICLE AND METHOD OF EFFICIENTLY CONTROLLING TRANSMISSION THEREOF

(71) Applicant: Hyundai Motor Company, Seoul (KR)

(72) Inventor: Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 80 days.

(21) Appl. No.: 15/218,567

(22) Filed: Jul. 25, 2016

(65) Prior Publication Data

US 2017/0129476 A1    May 11, 2017

(30) Foreign Application Priority Data

Nov. 6, 2015  (KR) .................. 10-2015-0155460

(51) Int. Cl.
| | |
|---|---|
| B60W 10/00 | (2006.01) |
| B60W 20/40 | (2016.01) |
| B60K 6/38 | (2007.10) |
| B60W 10/02 | (2006.01) |
| B60W 10/06 | (2006.01) |

(Continued)

(52) U.S. Cl.
CPC ............... B60W 20/40 (2013.01); B60K 6/38 (2013.01); B60W 10/02 (2013.01); B60W 10/06 (2013.01); B60W 10/10 (2013.01); F02D 43/00 (2013.01); B60K 6/442 (2013.01); B60W 2510/0208 (2013.01); B60W 2710/021 (2013.01); B60W 2710/0627 (2013.01); B60W 2710/1005 (2013.01); B60Y 2300/429 (2013.01); B60Y 2300/432 (2013.01); Y10S 903/912 (2013.01)

(58) Field of Classification Search
CPC ..................................................... B60W 10/00
USPC ........... 701/22; 180/65.1–65.8; 318/139–158
See application file for complete search history.

(56) References Cited

U.S. PATENT DOCUMENTS

| | | | | |
|---|---|---|---|---|
| 5,819,192 A | * | 10/1998 | Wakahara | B60K 23/0808 701/67 |
| 6,122,587 A | * | 9/2000 | Takahara | B60K 6/387 180/65.23 |

(Continued)

FOREIGN PATENT DOCUMENTS

| | | |
|---|---|---|
| JP | 2006-017042 A | 1/2006 |
| JP | 2006-306170 A | 11/2006 |

(Continued)

*Primary Examiner* — Jonathan L Sample
(74) *Attorney, Agent, or Firm* — Mintz Levin Cohn Ferris Glovsky and Popeo, P.C.; Peter F. Corless (57) ABSTRACT

A transmission control method that improves fuel economy when gear shift and engine clutch release are to be simultaneously performed is provided. A parallel type hybrid electric vehicle having an engine clutch mounted between an electric motor and an engine includes a first controller that executes transmission gear shift during a first control period and a second controller that operates the engine clutch and generates an engine clutch release request. A third controller permits the engine clutch release request to release the engine clutch before the second control period upon determining that a time when the release request has been generated is within a third control period, which is a period before a second control period in which actual shift is generated within the first control period, and a remaining time until a time when the second control period is started is equal to or greater than a critical time.

20 Claims, 7 Drawing Sheets

(51) Int. Cl.
   *B60W 10/10* (2012.01)
   *F02D 43/00* (2006.01)
   *B60K 6/442* (2007.10)

(56) References Cited

U.S. PATENT DOCUMENTS

| | | | | |
|---|---|---|---|---|
| 6,157,885 | A * | 12/2000 | Sakaguchi | B60W 10/06 477/46 |
| 6,282,492 | B1 * | 8/2001 | Gorai | G01C 21/32 701/25 |
| 6,537,169 | B1 * | 3/2003 | Morii | F16H 3/721 475/10 |
| 6,537,189 | B1 * | 3/2003 | Gehle | B31F 1/10 493/396 |
| 6,655,485 | B1 * | 12/2003 | Ito | B60W 20/40 180/65.6 |
| 6,896,090 | B2 * | 5/2005 | Kanda | B62D 5/008 180/402 |
| 7,108,630 | B2 * | 9/2006 | Ozeki | B60K 6/48 477/3 |
| 7,252,619 | B2 * | 8/2007 | Tabata | B60K 6/365 477/3 |
| 7,291,080 | B2 * | 11/2007 | Minagawa | B60K 6/365 475/5 |
| 7,351,182 | B2 * | 4/2008 | Kobayashi | B60K 6/48 477/5 |
| 9,327,715 | B2 * | 5/2016 | Tanishima | B60W 10/115 |
| 2003/0181276 | A1 * | 9/2003 | Minagawa | B60K 6/365 475/5 |
| 2004/0038775 | A1 * | 2/2004 | Shimizu | B60K 6/44 477/6 |
| 2005/0079942 | A1 * | 4/2005 | Bauknecht | B60K 6/365 475/5 |
| 2006/0048516 | A1 * | 3/2006 | Tenbrock | B60K 6/48 60/698 |
| 2006/0272869 | A1 * | 12/2006 | Hidaka | B60K 6/48 180/65.25 |
| 2007/0227791 | A1 * | 10/2007 | Ueno | B60K 6/387 180/65.245 |
| 2008/0306643 | A1 * | 12/2008 | Hanyu | B60K 6/48 701/22 |
| 2008/0312022 | A1 * | 12/2008 | Martin | F16H 3/66 475/83 |
| 2009/0048747 | A1 * | 2/2009 | Stridsberg | B60K 6/387 701/55 |
| 2009/0055073 | A1 * | 2/2009 | Matsubara | B60K 6/445 701/102 |
| 2009/0075774 | A1 * | 3/2009 | Tabata | B60K 6/445 475/150 |
| 2009/0118949 | A1 * | 5/2009 | Heap | B60W 10/06 701/55 |
| 2010/0125021 | A1 * | 5/2010 | Matsubara | B60K 6/445 477/5 |
| 2011/0021312 | A1 * | 1/2011 | Fukitani | B60K 6/48 477/5 |
| 2011/0212804 | A1 * | 9/2011 | Imamura | B60K 6/445 475/150 |
| 2011/0230308 | A1 * | 9/2011 | Inoue | F02D 41/0205 477/54 |
| 2012/0108384 | A1 * | 5/2012 | Tabata | B60K 6/445 477/3 |
| 2012/0165146 | A1 * | 6/2012 | Samie | F16D 25/0638 475/5 |
| 2012/0247911 | A1 * | 10/2012 | Noda | B60L 3/0023 192/113.32 |
| 2012/0258825 | A1 * | 10/2012 | Kodama | F16H 61/66272 474/69 |
| 2012/0270700 | A1 * | 10/2012 | Kamioka | F04B 49/022 477/167 |
| 2012/0309587 | A1 * | 12/2012 | Nozaki | B60K 6/48 477/5 |
| 2013/0116088 | A1 * | 5/2013 | Gibson | B60W 10/06 477/80 |
| 2013/0157806 | A1 * | 6/2013 | Koyama | B60W 20/30 477/5 |
| 2013/0218389 | A1 * | 8/2013 | Tanishima | B60K 6/48 701/22 |
| 2014/0018207 | A1 * | 1/2014 | Kobayashi | B60K 6/48 477/5 |
| 2014/0057755 | A1 * | 2/2014 | Gibson | B60W 10/06 477/77 |
| 2014/0316625 | A1 * | 10/2014 | Yoshikawa | B60W 10/02 701/22 |
| 2015/0353071 | A1 * | 12/2015 | Tanishima | B60W 10/115 701/22 |
| 2016/0031438 | A1 * | 2/2016 | Matsui | B60K 6/48 701/22 |
| 2016/0185336 | A1 * | 6/2016 | Ueno | B60K 6/48 701/22 |

FOREIGN PATENT DOCUMENTS

| | | |
|---|---|---|
| JP | 2007-015544 A | 1/2007 |
| KR | 10-2010-0020385 A | 2/2010 |
| KR | 2010-0019225 A | 2/2010 |
| KR | 10-1393562 B1 | 5/2014 |
| KR | 10-1481335 B1 | 1/2015 |
| KR | 10-1543005 B1 | 8/2015 |

* cited by examiner

HYBRID ELECTRIC VEHICLE AND METHOD OF EFFICIENTLY CONTROLLING TRANSMISSION THEREOF

CROSS REFERENCE TO RELATED APPLICATION(S)

This application claims the benefit of Korean Patent Application No. 10-2015-0155460, filed on Nov. 6, 2015, which is hereby incorporated by reference as if fully set forth herein.

BACKGROUND

Field of the Invention

The present invention relates to a hybrid electric vehicle and a method of efficiently controlling transmission thereof, and more particularly, to a transmission control method that improves fuel economy when gear shift and engine clutch release are to be simultaneously performed and a hybrid electric vehicle capable of performing the same.

Discussion of the Related Art

In general, a hybrid electric vehicle is a vehicle that uses two types of power sources, which mainly include an engine and an electric motor. In recent years, research has been conducted into the hybrid electric vehicle, since the hybrid electric vehicle exhibits higher fuel economy, higher power performance, and lower discharge of exhaust gas than a vehicle having an internal combustion engine.

The hybrid electric vehicle may operate in two traveling modes based on the powertrain thereof. One of the traveling modes is an electric vehicle (EV) mode, in which the hybrid electric vehicle is driven using the electric motor, and another is a hybrid electric vehicle (HEV) mode, in which the hybrid electric vehicle is driven using both the electric motor and the engine. Based on traveling conditions, the hybrid electric vehicle performs switching between the modes. Particularly, in a hybrid electric vehicle using a parallel type or transmission mounted electric device (TMED) type hybrid system having an electric motor and an engine clutch (EC) mounted between an engine and a transmission, engine clutch release and gear shift may be performed frequently and simultaneously during switching from the HEV mode to the EV mode.

To improve ride comfort during gear shift, engine clutch release control is not performed when a shift event is generated, and engine clutch release control is performed after gear shift is completed. However, the engine remains unnecessarily connected to a driving shaft. In particular, fuel injection into the engine is continuously performed, thereby reducing fuel economy.

SUMMARY

Accordingly, the present invention provides a hybrid electric vehicle and a method of efficiently controlling transmission thereof that substantially obviate one or more problems due to limitations and disadvantages of the related art. An object of the present invention is to provide a transmission control method capable of improving fuel economy when gear shift and engine clutch release are to be simultaneously performed and a hybrid electric vehicle capable of performing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a transmission of a parallel type hybrid electric vehicle having an engine clutch mounted between an electric motor and an engine may include starting a first control period to perform gear shift of the transmission, generating an engine clutch release request within the first control period, and upon determining that a time when the engine clutch release request has been generated is within a third control period, which is a period before a second control period in which actual shift is generated within the first control period, and a remaining time until a time when the second control period is started is equal to or greater than a critical time, allowing the engine clutch release request before the second control period.

In another aspect of the present invention, a parallel type hybrid electric vehicle having an engine clutch mounted between an electric motor and an engine may include a first controller configured to execute gear shift of a transmission during a first control period, a second controller configured to operate the engine clutch and generate an engine clutch release request, and a third controller configured to allow the engine clutch release before the second control period in response to determining that a time when the engine clutch release request has been generated is within a third control period, which is a period before a second control period in which actual shift is generated within the first control period, and a remaining time until a time when the second control period is started is equal to or greater than a critical time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. The suffixes "module" and "unit" of elements herein are used for convenience of description and thus can be used interchangeably, and do not have any distinguishable meanings or functions.

Figure 1:
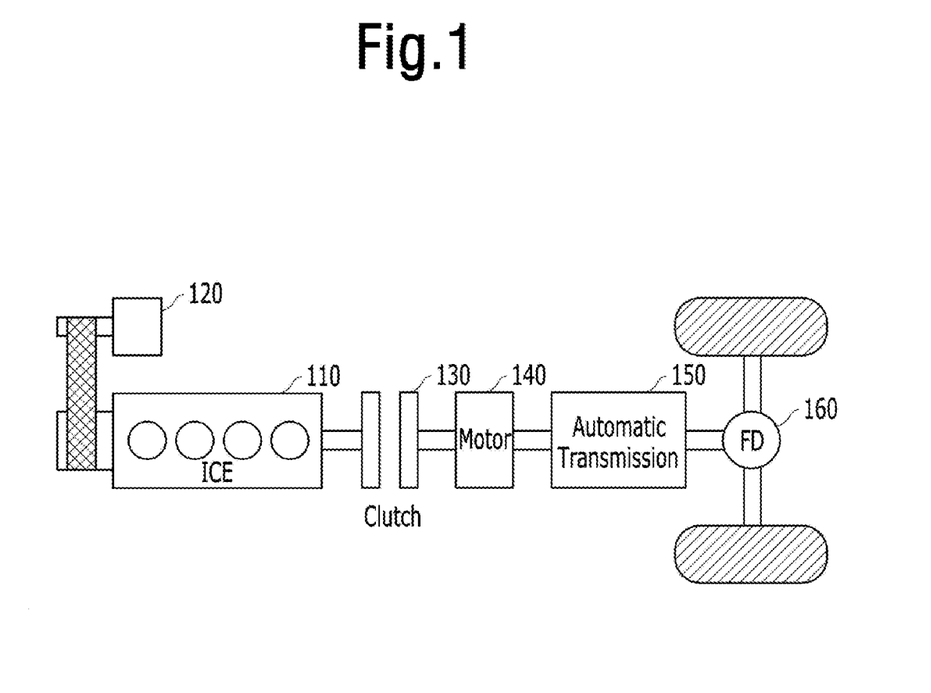
FIG. 1 is a view showing an example of a powertrain structure of a hybrid electric vehicle according to an exemplary embodiment of the present invention.

First, the structure of a hybrid electric vehicle to which exemplary embodiments of the present invention is applicable will be described with reference to FIG. 1. FIG. 1 is a view showing an example of a powertrain structure of a hybrid electric vehicle. Referring to FIG. 1, a powertrain structure of a hybrid electric vehicle may include a parallel type hybrid system having an electric motor 140 and an engine clutch 130 mounted between an internal combustion engine (ICE) 110 and a transmission 150.

In particular, when an accelerator pedal is engaged (e.g., pressure is exerted onto the pedal) after a vehicle is started, the motor 140 may be first driven using electric power from a battery when the engine clutch 130 is open, and then power from the motor 140 may be transmitted to wheels via the transmission 150 and a final drive (FD) 160 to move the wheels (e.g., an EV mode). When higher driving force is required as the vehicle is gradually accelerated, a start generation motor 120 may be operated to drive the engine 110.

When the rotational speeds of the engine 110 and the motor 140 are about the same, the engine clutch 130 may be locked, with the result that both the engine 110 and the motor 140 may be configured to drive the vehicle (e.g., transition from the EV mode to an HEV mode). When the vehicle is decelerated, the engine clutch 130 may be opened, and the engine 110 may be stopped (e.g., transition from the HEV mode to the EV mode). Accordingly, the vehicle may be configured to charge the battery through the motor using driving force from the wheels, which is referred to as regeneration of braking energy or regenerative braking. The start generation motor 120 may be configured to operate as a start motor when starting the engine and as a generator after starting the engine. Therefore, the start generation motor 120 may be referred to as a hybrid start generator (HSG).

Figure 2:
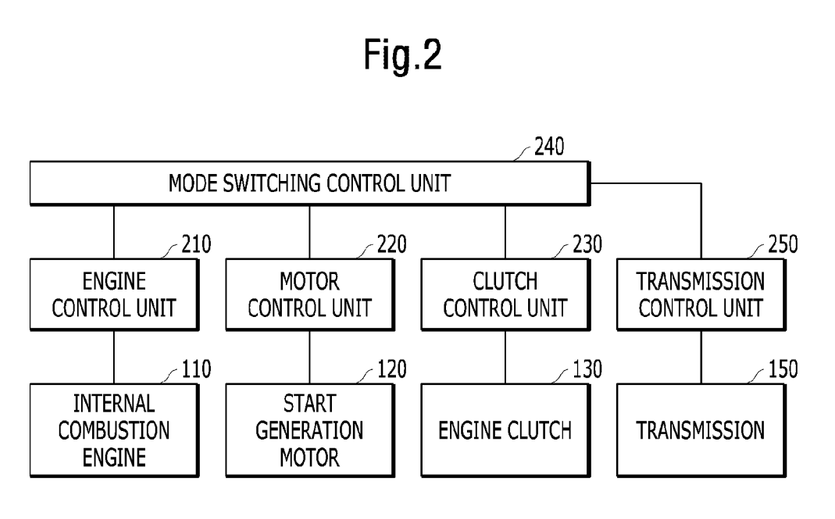
FIG. 2 is a block diagram showing an example of a control system of the hybrid electric vehicle according to an exemplary embodiment of the present invention.

An interrelation between various controllers for switching between traveling modes of the vehicle using the powertrain is shown in FIG. 2. FIG. 2 is a block diagram showing an example of a control system of the hybrid electric vehicle to which exemplary embodiments of the present invention is applicable. Referring to FIG. 2, in the hybrid electric vehicle, the engine 110 may be operated by an engine control unit 210, the torque of the start generation motor 120 may be adjusted by a motor control unit (MCU) 220, and the engine clutch 130 may be operated by a clutch control unit 230. The engine control unit 210 may also be referred to as an engine management system (EMS). In addition, the transmission 150 may be operated by a transmission control unit 250. The various controllers as described above may all be operated by an upper or overall controller.

Each controller may be connected to a mode switching controller 240 configured to execute an overall mode switching process to provide information necessary for engine clutch control during traveling mode switching or gear shift under the control of the mode switching controller 240 or to perform an operation based on a control signal from the mode switching controller 240. More specifically, the mode switching controller 240 may be configured to determine whether to perform mode switching based on a traveling state of the vehicle. For example, the mode switching controller 240 may be configured to determine an open time of the engine clutch 130, and, when the engine clutch 130 is opened, may be configured to perform hydraulic control (for a wet type EC) or torque capacity control (for a dry type EC). In addition, the mode switching controller 240 may be configured to determine a state (e.g., lockup, slip, or open) of the engine clutch 130, and may be configured to adjust a time when to interrupt fuel injection into the engine 110.

Further, it is obvious to those skilled in the art that the interrelation between the controllers and the functions of the controllers are illustrative, and not restrictive by the names. For example, the mode switching controller 240 may be configured such that one of the other controllers excluding the mode switching controller 240 provides the corresponding function or such that two or more provide the corresponding function in a divided fashion.

Figure 3:
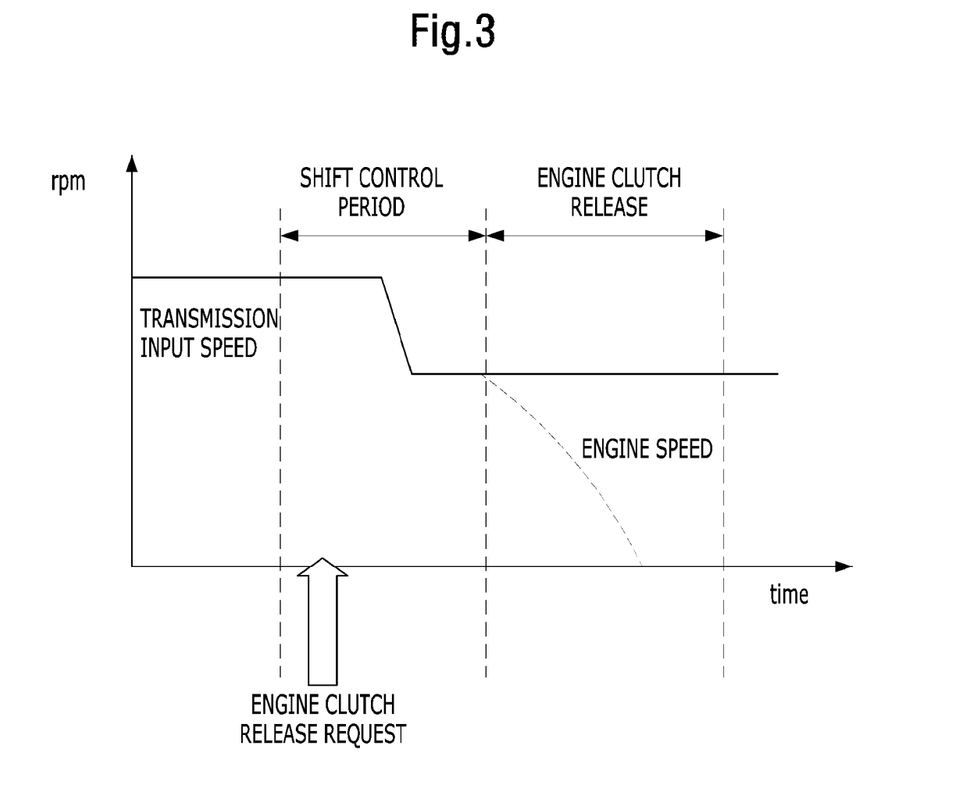
FIG. 3 is a view showing an example of a general engine clutch release process during gear shift according to an exemplary embodiment of the present invention.

Hereinafter, a general engine clutch release process during gear shift based on the above structure of the vehicle will be described. FIG. 3 is a view showing an example of a general engine clutch release process during gear shift. Referring to FIG. 3, when an engine clutch release request for traveling mode switching is generated, the engine clutch may be released after a shift control period, in which gear shift is actually performed in the transmission. In other words, the connection between the engine and a driving shaft may be released after gear shift has been completed. When fuel injection in the engine is interrupted before the engine clutch is released, the driving force may be lost due to frictional torque of the engine. Further, when fuel injection in the engine is continuously performed, fuel may be unnecessarily wasted.

To prevent such loss, an exemplary embodiment of the present invention proposes a method of pre-releasing the engine clutch at the beginning of the shift control period, that is, before actual shift is performed (e.g., before the speed input to the transmission is changed). In particular, this exemplary embodiment proposes a method of a specific controller determining whether and when to allow engine clutch release based on a shift control step when shift control and EC release control are to be performed simultaneously. When to allow the engine clutch release may be determined based on a state in which shift control performance is not deteriorated due to instantaneous change in number of rotations or impact/vibration due to the engine clutch release. More specifically, a time when an engine clutch release request is generated may be divided into a plurality of steps based on actual shift such that the engine clutch release is allowed only at a step at which an actual shift period is not substantially affected even when the engine clutch is released and such that the engine clutch is released after actual shift when the engine clutch release is not allowed.

Figure 4A:
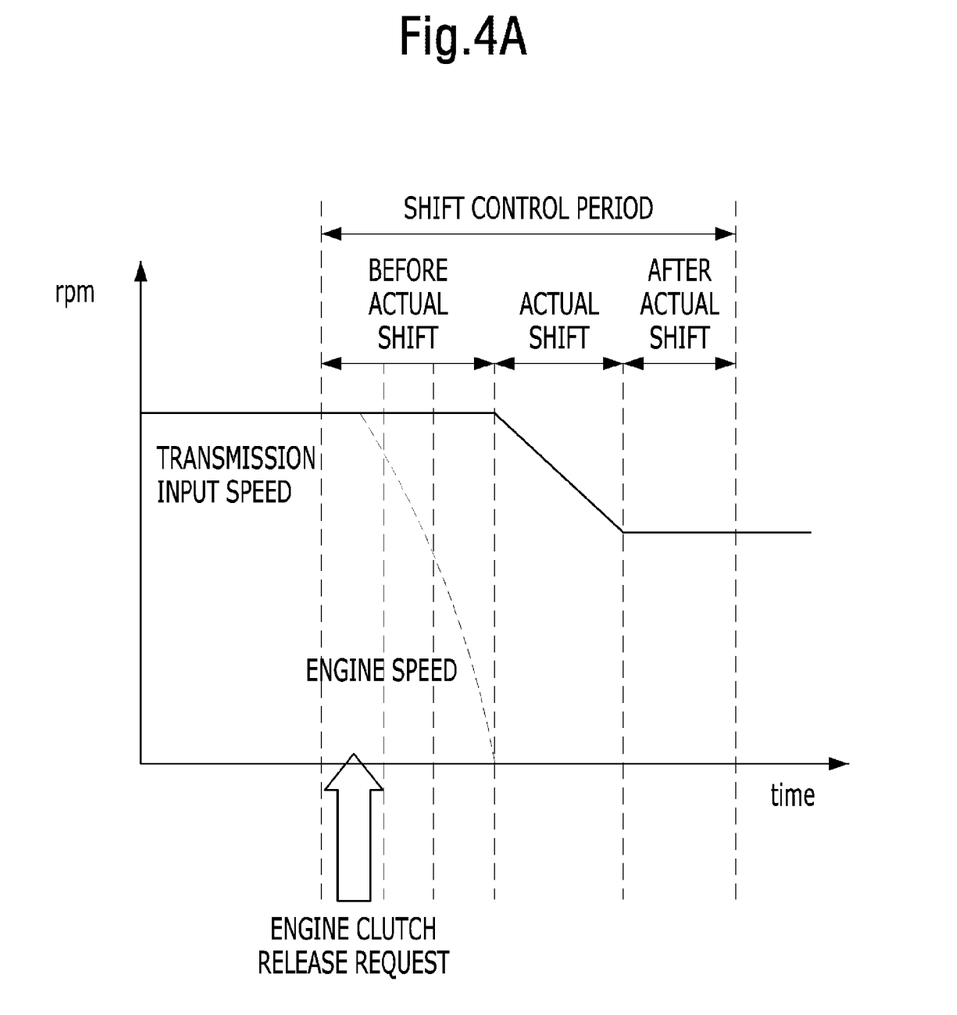
FIGS. 4A to 4C are views showing an example of a process of performing engine clutch release control at every time at which an engine clutch release request according to an exemplary embodiment of the present invention is generated.
Figure 4B:
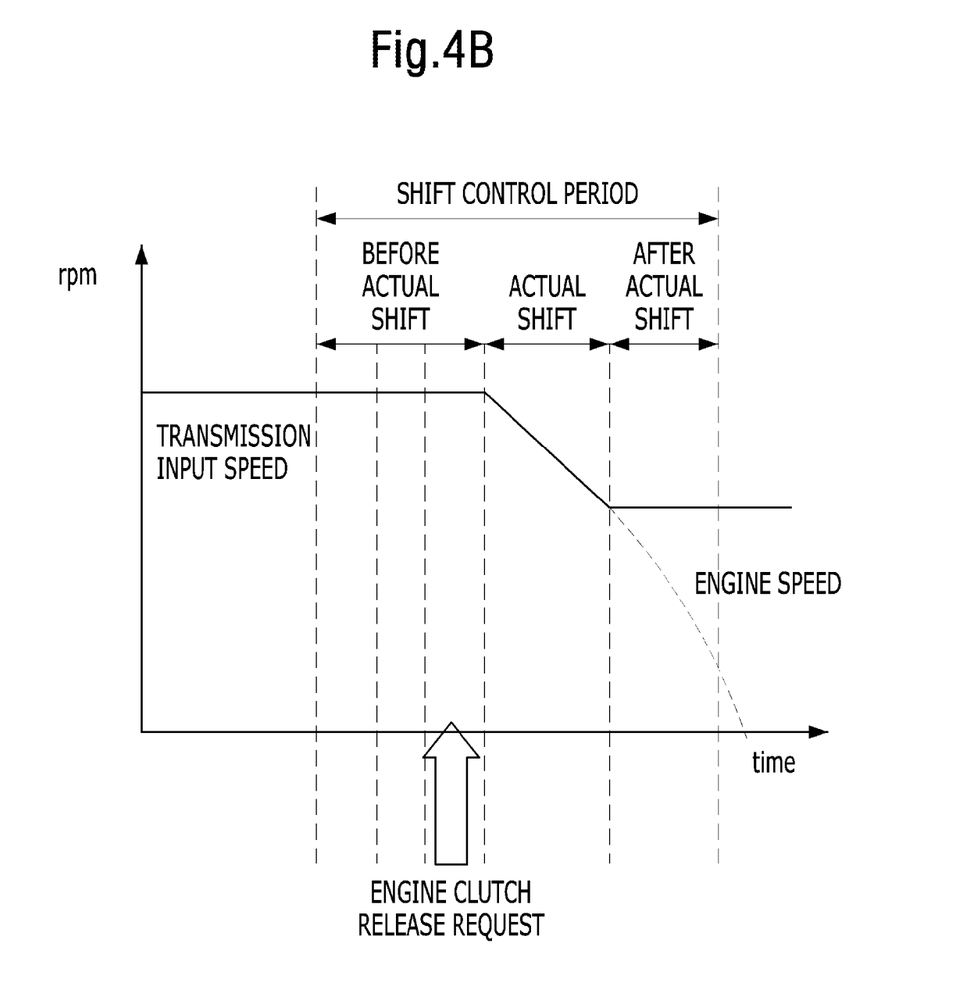
Figure 4C:
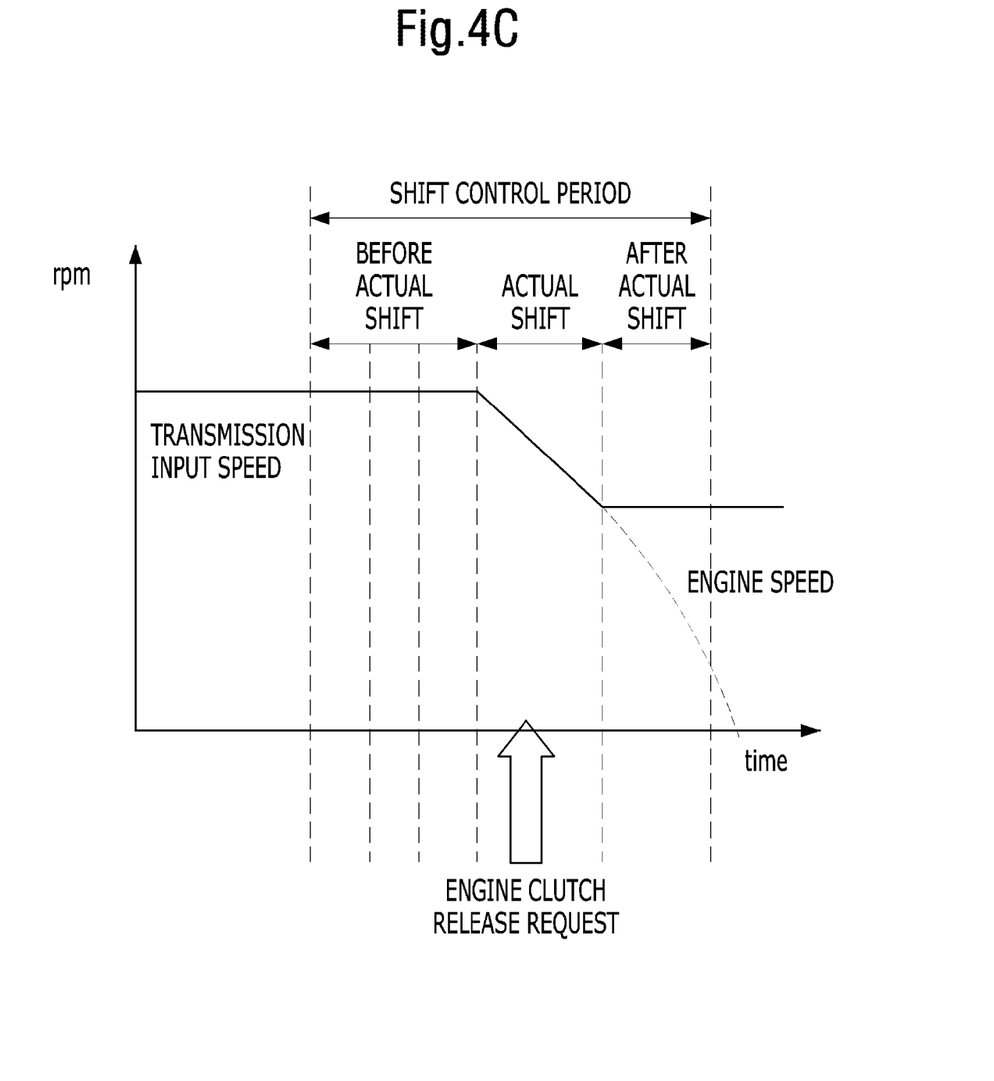

In an aspect of this exemplary embodiment, a specific controller configured to determine whether or when to allow engine clutch release may be the mode switching controller. In addition, a time when an engine clutch release request is generated may be divided into three steps. Specifically, each step may be divided into 1) a time when actual shift has not been performed and the actual shift is not affected, 2) a time when actual shift has not been performed but the actual shift is affected, and 3) an actual shift period. Each step will be described with reference to graphs of FIGS. 4A to 4C. FIGS. 4A to 4C are views showing an example of a process of performing engine clutch release control at every time at which an engine clutch release request according to an exemplary embodiment of the present invention is generated.

Referring to FIG. 4A, a shift control period in which the transmission performs gear shift may be divided into a period before actual shift, in which actual shift has not been performed, an actual shift period, in which gear shift is actually performed as the result of clutch open-slip-lockup in the transmission, and a period after actual shift. When a time when an engine clutch release request is generated in the period before actual shift does not affect actual shift, engine clutch release may be immediately allowed, whereby the engine clutch may be released before the actual shift period. Particularly, the time when the actual shift is not affected may indicate a case in which a time between a time when an engine clutch release request is generated and a time when entry into the actual shift period is performed is equal to or greater than a critical time. The critical time, which is a time sufficient enough to such an extent that engine clutch release does not affect actual shift, may be set based on the specifications of the transmission, the engine, and the engine clutch.

When a time when an engine clutch release request is generated is a time when actual shift is affected, as shown in FIG. 4B or 4C, the engine clutch release may be performed after the actual shift period. In particular, the time when the actual shift is affected may indicate a case in which a time between a time when an engine clutch release request is generated and a time when entry into the actual shift period is performed in the period after actual shift is less than a critical time, as shown in FIG. 4B, or a case in which an engine clutch release request is generated in the actual shift period, as shown in FIG. 4C.

Figure 5:
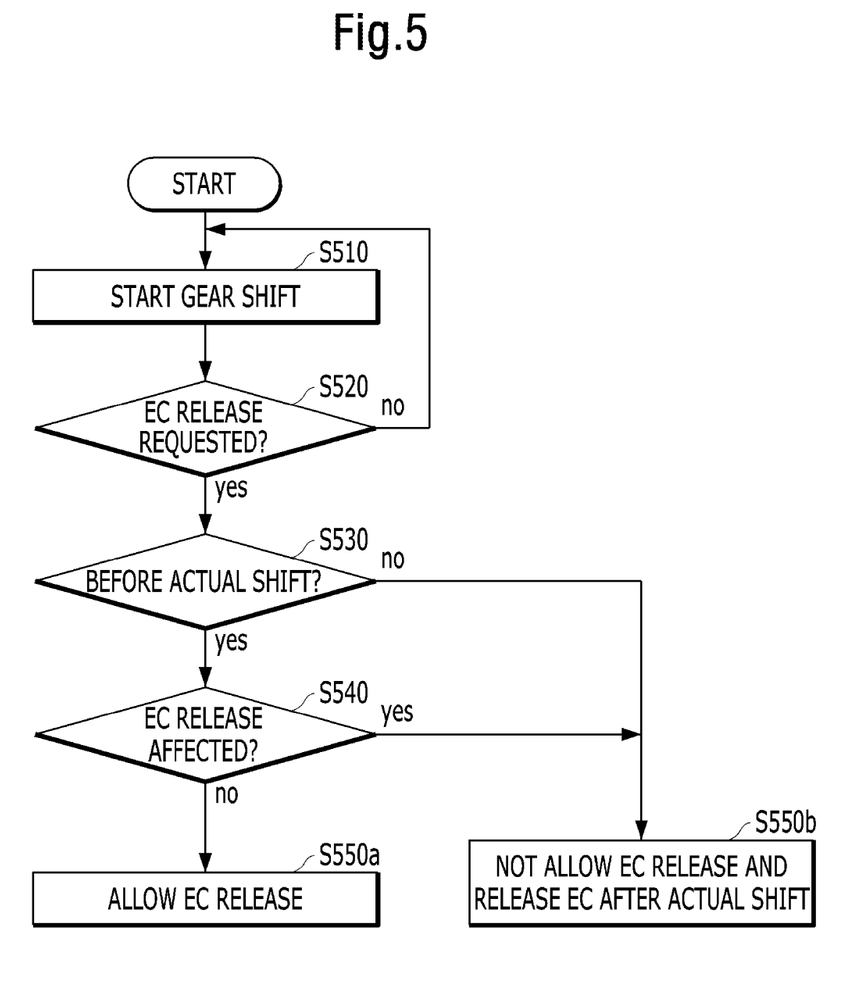
FIG. 5 is a flowchart showing an example of a process of performing engine clutch release control at every time at which an engine clutch release request according to an exemplary embodiment of the present invention is generated.

Hereinafter, the above shift control process will be described with reference to a flowchart of FIG. 5. FIG. 5 is a flowchart showing an example of a process of performing engine clutch release control at every time at which an engine clutch release request according to an exemplary embodiment of the present invention is generated. Referring to FIG. 5, gear shift (i.e. a shift control period) may be started as the result of the transmission controller performing gear shift (S510). Further, the transmission controller may be configured to inform (e.g., transmit a signal indicating) the mode switching controller that the gear shift has been started.

When an engine clutch release request from the clutch controller is transmitted to the mode switching controller (S520), the mode switching controller may be configured to determine whether the current step is a step before actual shift (S530). In response to determining that the current step is the step before actual shift, the mode switching controller may be configured to determine whether the current time is a time when engine clutch release affects actual shift (S540). Additionally, in response to determining that the engine clutch release does not affect the actual shift, the mode switching controller may be configured to permit the engine clutch release (i.e. transmits release approval to the clutch controller) to thus release the engine clutch before the actual shift is performed (S550a).

Furthermore, when the current time is a time when the engine clutch release affects actual shift although the current step is a step before actual shift or when engine clutch release is requested in an actual shift period, the mode switching controller may be configured to inform the clutch controller that the engine clutch release is not allowed and transmit an instruction to the clutch controller to release the engine clutch after the actual shift period (S550b).

In the above description, the controller that determines whether to allow the engine clutch release in response to the engine clutch release request may be the mode switching controller, which, however, it is obvious to those skilled in the art that the engine clutch release control method according to this exemplary embodiment may be performed by an additional controller having a corresponding function or by another controller, such as the clutch controller or the transmission controller, shown in FIG. 2, excluding the mode switching controller Meanwhile, the method according to the present invention may be implemented as code that can be written on a program recorded medium and thus read by a computer. The computer-readable medium may be any type of recording device in which data is stored in a computer-readable manner. The computer-readable medium may include, for example, a hard disk drive (HDD), a solid state disk (SSD), a silicon disk drive (SDD), a read only memory (ROM), a random access memory (RAM), a compact disc read only memory (CD-ROM), a magnetic tape, a floppy disk, and an optical data storage device. In addition, the computer-readable medium may be implemented in the form of a carrier wave (for example, a transmission over the Internet).

As is apparent from the above description, it may be possible to the hybrid electric vehicle related to at least one exemplary embodiment of the present invention to more efficiently perform shift control. In particular, whether to release the engine clutch may be determined based on a shift control when engine clutch release and gear shift are to be performed simultaneously, thereby improving fuel economy.

It should be noted that effects of the present invention are not limited to the effects of the present invention as mentioned above, and other unmentioned effects of the present invention will be clearly understood by those skilled in the art from the following description. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a transmission of a parallel type hybrid electric vehicle having an engine clutch mounted between an electric motor and an engine, the method comprising:
    starting, by a controller, a first control period to perform gear shift of the transmission;
    generating, by the controller, an engine clutch release request within the first control period; and
    permitting, by the controller, the engine clutch release request to release the engine clutch before the second control period, by the controller, in response to determining that a time when the engine clutch release request has been generated is within a third control period, which is a period before a second control period in which actual shift is generated within the first control period, and a remaining time until a time when the second control period is started is equal to or greater than a critical time.

2. The method according to claim 1, further comprising: blocking, by the controller, the engine clutch release request to release the engine clutch after the second control period, in response to determining that the time when the engine clutch release request has been generated is within the third control period and the remaining time until the time when the second control period is started is less than the critical time.

3. The method according to claim 1, further comprising: blocking, by the controller, the engine clutch release request to release the engine clutch is released after the second control period, in response to determining that the time when the engine clutch release request has been generated is within the second control period.

4. The method according to claim 3, further comprising: releasing, by the controller, the engine clutch as a result of permitting the engine clutch release request; and interrupting, by the controller, fuel injection into the engine.

5. The method according to claim 1, wherein the engine clutch release request is transmitted from a first controller configured to operate the engine clutch to a second controller configured to execute traveling mode switching.

6. The method according to claim 1, wherein the critical time is set based on whether the engine clutch release affects the actual shift.

7. The method according to claim 1, wherein the electric motor is disposed closer to driving wheels than the engine based on the engine clutch.

8. A parallel type hybrid electric vehicle having an engine clutch mounted between an electric motor and an engine, the hybrid electric vehicle comprising:
    a first controller configured to execute gear shift of a transmission during a first control period;
    a second controller for controlling the engine clutch and generating an engine clutch release request; and
    a third controller configured to permit the engine clutch release request to release the engine clutch before the second control period in response to determining that a time when the engine clutch release request has been generated is within a third control period, which is a period before a second control period in which actual shift is generated within the first control period, and a remaining time until a time when the second control period is started is equal to or greater than a critical time.

9. The hybrid electric vehicle according to claim 8, wherein, in response to determining that the time when the engine clutch release request has been generated is within the third control period and the remaining time until the time when the second control period is started is less than the critical time, the third controller is configured to block the engine clutch release request to release the engine clutch after the second control period.

10. The hybrid electric vehicle according to claim 8, wherein, in response determining that the time when the engine clutch release request has been generated is within the second control period, the third controller is configured to block the engine clutch release request to release the engine clutch after the second control period.

11. The hybrid electric vehicle according to claim 8, further comprising:
    a fourth controller configured to interrupt fuel injection into the engine in response to releasing the engine clutch as a result of permitting the engine clutch release request.

12. The hybrid electric vehicle according to claim 8, wherein the engine clutch release request is transmitted from the second controller to the third controller configured to execute traveling mode switching.

13. The hybrid electric vehicle according to claim 8, wherein the critical time is set based on whether the engine clutch release affects the actual shift.

14. The hybrid electric vehicle according to claim 8, wherein the electric motor is disposed closer to driving wheels than the engine based on the engine clutch.

15. A non-transitory computer readable medium containing program instructions executed by a controller for controlling a transmission of a parallel type hybrid electric vehicle having an engine clutch mounted between an electric motor and an engine, the computer readable medium comprising:
    program instructions that start a first control period to perform gear shift of the transmission;
    program instructions that generate an engine clutch release request within the first control period; and
    program instructions that permit the engine clutch release request to release the engine clutch before the second control period, by the controller, in response to determining that a time when the engine clutch release request has been generated is within a third control period, which is a period before a second control period in which actual shift is generated within the first control period, and a remaining time until a time when the second control period is started is equal to or greater than a critical time.

16. The non-transitory computer readable medium of claim 15, further comprising:
   program instructions that block the engine clutch release request to release the engine clutch after the second control period, in response to determining that the time when the engine clutch release request has been generated is within the third control period and the remaining time until the time when the second control period is started is less than the critical time.

17. The non-transitory computer readable medium of claim 15, further comprising:
   program instructions that block the engine clutch release request to release the engine clutch is released after the second control period, in response to determining that the time when the engine clutch release request has been generated is within the second control period.

18. The non-transitory computer readable medium of claim 17, further comprising:
   program instructions that release the engine clutch as a result of permitting the engine clutch release request; and
   program instructions that interrupt fuel injection into the engine.

19. The non-transitory computer readable medium of claim 15, wherein the critical time is set based on whether the engine clutch release affects the actual shift.

20. The non-transitory computer readable medium of claim 15, wherein the electric motor is disposed closer to driving wheels than the engine based on the engine clutch.

* * * * *